United States Patent
Asai

(10) Patent No.: US 9,483,214 B2
(45) Date of Patent: Nov. 1, 2016

(54) INFORMATION PROCESSING APPARATUS, COOPERATION SYSTEM AND COMPUTER READABLE MEDIUM

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/671,385

(22) Filed: Mar. 27, 2015

(65) Prior Publication Data

US 2015/0378659 A1 Dec. 31, 2015

(30) Foreign Application Priority Data

Jun. 30, 2014 (JP) ................................ 2014-134926

(51) Int. Cl.
*G06F 3/12* (2006.01)

(52) U.S. Cl.
CPC ............... *G06F 3/121* (2013.01); *G06F 3/126* (2013.01); *G06F 3/1226* (2013.01); *G06F 3/1236* (2013.01); *G06F 3/1292* (2013.01)

(58) Field of Classification Search
USPC ....................................................... 358/1.15
See application file for complete search history.

(56) References Cited

U.S. PATENT DOCUMENTS

| 6,609,162 | B1 | 8/2003 | Shimizu et al. |
| 2009/0316206 | A1* | 12/2009 | Anezaki ............. H04N 1/32619 358/1.15 |
| 2013/0254297 | A1* | 9/2013 | Kobayashi ............ H04L 65/403 709/205 |

FOREIGN PATENT DOCUMENTS

JP 2000-187573 A 7/2000

* cited by examiner

*Primary Examiner* — Ngon Nguyen
(74) *Attorney, Agent, or Firm* — Banner & Witcoff, Ltd.

(57) ABSTRACT

An information processing apparatus configured to control a cooperation operation that is to be executed by a first apparatus and a second apparatus, executes: reception processing of receiving the target data from the first apparatus; first determination processing of determining whether the information processing apparatus can communicating with the second apparatus; storing control processing of storing the received target data in a storage unit when it is determined in the first determination processing that the communication unit is in a non-communicable state with the second apparatus; second determination processing of determining whether the information processing apparatus cannot communicate with the second apparatus, after executing the storing control processing; and transmission processing of wirelessly transmitting the target data stored in the storage unit to the second apparatus through the communication unit when the information processing apparatus can communicate with the second apparatus.

13 Claims, 10 Drawing Sheets

FIG.3A

| COOPERATION OPERATION ID | APPARATUS ID | OPERATION CONTENT | SSID |
|---|---|---|---|
| 001 | SERVER A | DL | — |
| | MFC−A | PRINT | abc |

FIG.3B

| COOPERATION OPERATION ID | APPARATUS ID | OPERATION CONTENT | SSID |
|---|---|---|---|
| 002 | MFC−A | SCAN | abc |
| | MFC−B | PRINT | abc |

FIG.3C

| APPARATUS ID | TARGET DATA |
|---|---|
| | |

FIG.3D

| APPARATUS ID | SSID | FIRST OPERATION | SECOND OPERATION |
|---|---|---|---|
| SERVER A | — | UL | — |
| MFC−A | abc | SCAN | PRINT |
| MFC−B | xyz | — | PRINT |
| ⋮ | ⋮ | ⋮ | ⋮ |

INFORMATION PROCESSING APPARATUS, COOPERATION SYSTEM AND COMPUTER READABLE MEDIUM

CROSS REFERENCE TO RELATED APPLICATION

This application is based upon and claims the benefit of priority of Japanese Patent Application No. 2014-134926 filed on Jun. 30, 2014, the contents of which are incorporated herein by reference in its entirety.

BACKGROUND

The present disclosure relates to a program for operating a plurality of apparatuses in cooperation with each other.

In the related art, an information processing apparatus has been known which is configured to operate (hereinafter, referred to as 'cooperation operation') an input apparatus and an output apparatus selected from a plurality of devices connected to a network in cooperation with each other. The information processing apparatus is configured to download target data from a storage server, which is an example of the input apparatus, and to enable a printer, which is an example of the output apparatus, to record an image represented by the target data on a recording sheet.

It cannot be said that the information processing apparatus can always perform communication with both the input apparatus and the output apparatus during the cooperation operation. For this reason, for example, there is a possibility that even though the target data has been received from the input apparatus, the target data cannot be transmitted to the output apparatus. In this case, if the cooperation operation should be performed again from the first, a throughput of the cooperation operation is lowered and a user may be required to perform an unnecessary operation.

SUMMARY

It is therefore an object of one aspect of the present disclosure to provide a program capable of implementing a cooperation operation including processing of transmitting target data received from a first apparatus to a second apparatus without enabling a user to be conscious of a configuration of a communication network.

The aspect of the present disclosure provides the following arrangements:

A non-transitory computer readable recording medium storing a computer program for an information processing apparatus comprising a communication unit configured to perform wireless communication with a plurality of apparatuses through a communication network, an operation unit configured to receive a user's operation and a storage unit, the information processing apparatus being configured to control a cooperation operation that is to be executed by a first apparatus and a second apparatus selected from the plurality of apparatuses, wherein the cooperation operation causes the first apparatus to execute a first operation including transmitting target data to the information processing apparatus, and causes the second apparatus to execute a second operation including receiving the target data from the information processing apparatus after the first operation, the computer program when executed by a processor of the information processing apparatus causing the information processing apparatus to execute:

reception processing of wirelessly receiving the target data from the first apparatus in response to receiving by the operation unit a user's operation of inputting a start instruction to start the cooperation operation;

first determination processing of determining whether the communication unit is in a communicable state capable of wirelessly communicating with the second apparatus;

storing control processing of associating the received target data with apparatus identification information for identifying the second apparatus and storing the received target data in the storage unit when it is determined in the first determination processing that the communication unit is in a non-communicable state incapable of wirelessly communicating with the second apparatus;

second determination processing of determining whether the communication unit is in the communicable state with the second apparatus, after executing the storing control processing; and transmission processing of wirelessly transmitting the target data stored in the storage unit in association with the apparatus identification information for identifying the second apparatus, to the second apparatus through the communication unit when it is determined in the second determination processing that the communication unit is in the communicable state with the second apparatus.

An information processing apparatus configured to control a cooperation operation that is to be executed by a first apparatus and a second apparatus, wherein the cooperation operation is to cause the first apparatus to execute a first operation including transmitting target data to the information processing apparatus, and is to cause the second apparatus to execute a second operation including receiving the target data from the information processing apparatus after the first operation, the information processing apparatus comprising:

a communication unit configured to perform wireless communication with the plurality of apparatuses through a communication network;

an operation unit configured to receive a user's operation;

a processor; and a storage unit storing a computer readable program, when executed by the processor, causing the information processing apparatus to execute:

reception processing of wirelessly receiving the target data from the first apparatus in response to receiving by the operation unit a user's operation of inputting a start instruction to start the cooperation operation;

first determination processing of determining whether the first apparatus is in a communicable state capable of wirelessly communicating with the second apparatus;

storing control processing of associating the received target data with apparatus identification information for identifying the second apparatus and storing the received target data in the storage unit when it is determined in the first determination processing that the communication unit is in a non-communicable state incapable of wirelessly communicating with the second apparatus;

second determination processing of determining whether the communication unit is in the communicable state with the second apparatus, after executing the storing control processing; and transmission processing of wirelessly transmitting the target data stored in the storage unit in association with the apparatus identification information for identifying the second apparatus, to the second apparatus through the communication unit when it is determined in the second determination processing that the communication unit is in the communicable state with the second apparatus.

A cooperation system comprising:

a first apparatus;

a second apparatus; and an information processing apparatus configured to control a cooperation operation that is to be executed by the first apparatus and the second apparatus, wherein the cooperation operation is to cause the first apparatus to execute a first operation including transmitting target data to the information processing apparatus, and is to cause the second apparatus to execute a second operation including receiving the target data from the information processing apparatus after the first operation, wherein the information processing apparatus comprises:

a communication unit configured to perform wireless communication with the plurality of apparatuses through a communication network;

an operation unit configured to receive a user's operation;

a processor; and a storage unit storing a computer readable program, when executed by the processor, causing the information processing apparatus to execute:

reception processing of wirelessly receiving the target data from the first apparatus in response to receiving by the operation unit a user's operation of inputting a start instruction to start the cooperation operation;

first determination processing of determining whether the first apparatus is in a communicable state capable of wirelessly communicating with the second apparatus;

storing control processing of associating the received target data with apparatus identification information for identifying the second apparatus and storing the received target data in the storage unit when it is determined in the first determination processing that the communication unit is in a non-communicable state incapable of communicating with the second apparatus;

second determination processing of determining whether the communication unit is in the communicable state with the second apparatus, after executing the storing control processing; and transmission processing of wirelessly transmitting the target data stored in the storage unit in association with the apparatus identification information for identifying the second apparatus, to the second apparatus through the communication unit when it is determined in the second determination processing that the communication unit is in the communicable state with the second apparatus.

BRIEF DESCRIPTION OF DRAWINGS

FIG. 3A to 3D show examples of data to be stored in a data storage area 62B, in which FIGS. 3A and 3B show a cooperation operation list, FIG. 3C shows associated apparatus ID and target data, and FIG. 3D shows associated apparatus ID, SSID, first operation and second operation.

FIGS. 7A and 7B illustrates display examples of a display unit 53, in which FIG. 7A illustrates a cooperation operation selection screen and FIG. 7B illustrates a cooperation operation screen.

FIGS. 8A and 8B illustrates display examples of the display unit 53, in which FIG. 8A illustrates a notification screen and FIG. 8B illustrates an inquiry screen.

FIGS. 9A and 9B illustrates display examples of the display unit 53, in which FIG. 9A illustrates an error screen and FIG. 9B illustrates an interruption notification screen.

FIGS. 10A and 10B illustrates display examples of the display unit 53, in which FIG. 10A illustrates an additional destination selection screen and FIG. 10B illustrates a first apparatus selection screen.

DESCRIPTION OF ILLUSTRATIVE EMBODIMENTS

Hereinafter, an illustrative embodiment of the present disclosure will be described with reference to the drawings. Meanwhile, the illustrative embodiment, which will be described later, is just an example of an aspect of the present disclosure, and the illustrative embodiment of the present disclosure can be appropriately changed without changing the gist of the present invention.

Figure 1:
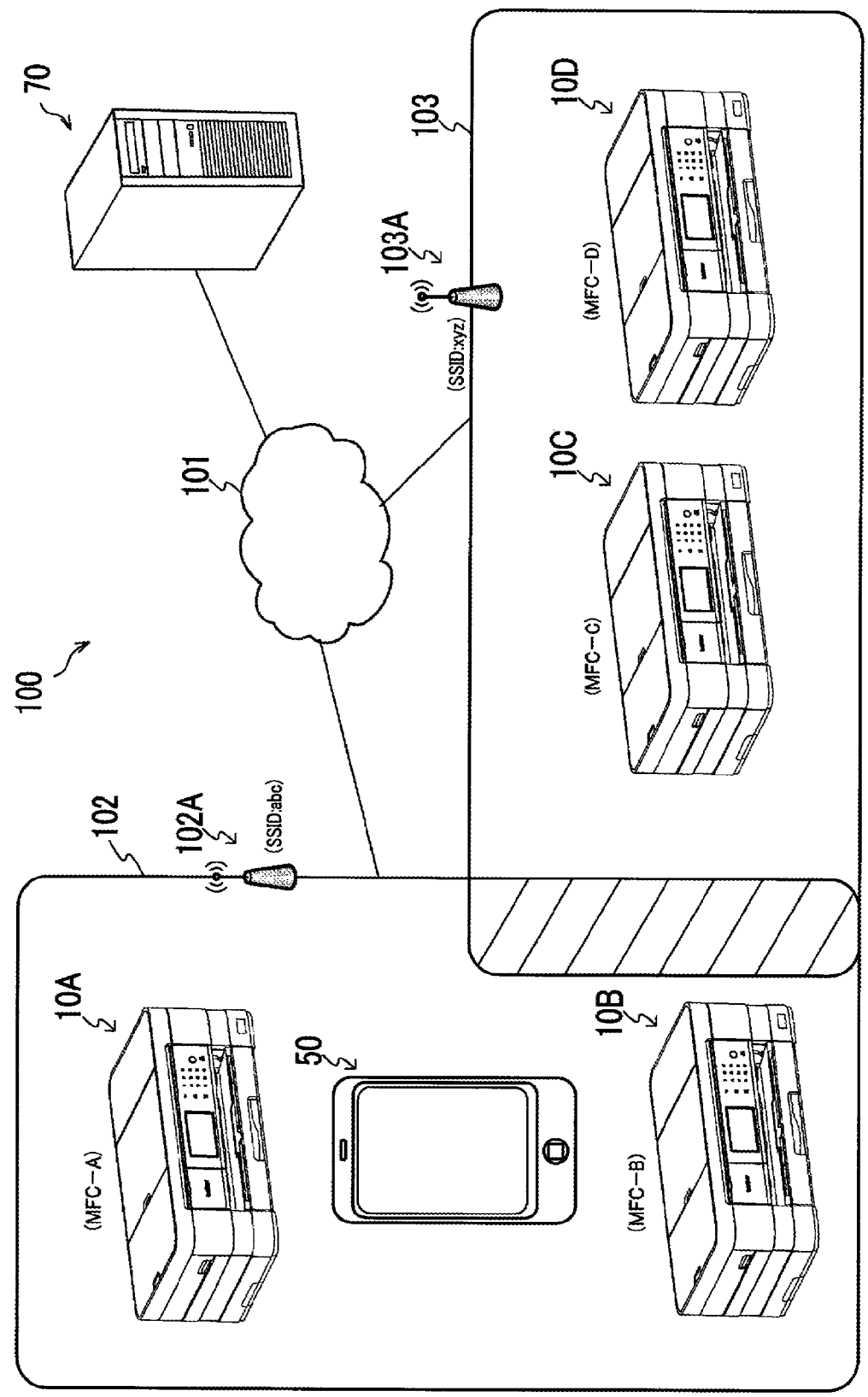
FIG. 1 is a schematic view of a cooperation system 100 of an illustrative embodiment.

FIG. 1 is a schematic view of a cooperation system 100 of an illustrative embodiment. The cooperation system 100 shown in FIG. 1 includes one or more complex machines 10A, 10B, 10C, 10D (hereinafter, also collectively referred to as 'complex machine 10'), a portable terminal 50, and one or more server apparatuses 70. The complex machines 10A, 10B, 10C, 10D, the portable terminal 50 and the server apparatus 70 are configured to perform communication with each other through a communication network. Although a specific example of the communication network is not particularly limited, the communication network of this illustrative embodiment includes the Internet 101, and wireless LANs (abbreviation of Local Area Network) 102, 103 connected to the Internet 101.

In the example of FIG. 1, the wireless LANs 102, 103 are connected to the Internet 101 through routers (not shown) and the like. Also, the complex machines 10A, 10B belong to the wireless LAN 102, the complex machines 10C, 10D belong to the wireless LAN 103, and the server apparatus 70 is connected to the Internet 101. Also, the portable terminal 50 may belong to any of the wireless LANs 102, 103. In the meantime, the description 'belonging to the wireless LAN 102' means, for example, that a setting for belonging to the wireless LAN 102 is made for an apparatus, the apparatus can perform communication with another apparatus belonging to the wireless LAN 102, more specifically, the same SSID (abbreviation of Service Set IDentifier) as an access point 102A of the wireless LAN 102 is set for the apparatus and the apparatus is provided with a network address allotted to the wireless LAN 102. The SSID is an example of the connection information for connecting a communication unit 55 to the wireless LANs 102, 103.

Also, in the example of FIG. 1, the wireless LANs 102, 103 are provided with access points 102A, 103A, respectively. The access points 102A, 103A are configured to repeatedly transmit beacon signals with a predetermined period. The beacon signals include the SSIDs set for the access points 102A, 103A. The complex machine 10 and portable terminal 50 having received the beacon signals transmitted from the access points 102A, 103A are connected to the access points 102A, 103 by wirelessly transmitting connection requests to the access points 102A, 103A. In the meantime, since the details of the processing (hereinafter, referred to as 'connection processing') are well-known methods defined in IEEE 802.11 and the like, for example, the descriptions thereof are omitted.

In FIG. 1, a frame denoted with a reference numeral 102 indicates an area in which the beacon signal transmitted from the access point 102A can be received. Also a frame denoted with a reference numeral 103 indicates an area in which the beacon signal transmitted from the access point 103A can be received. Further, a hatched area of FIG. 1 indicates an area in which the beacon signals transmitted from both the access points 102A, 103A can be received.

The complex machine 10 belonging to the wireless LAN 102 can perform wireless communication with the portable terminal 50 belonging to the wireless LAN 102 and the portable terminal 50 on the Internet 101, via the access point 102A. The portable terminal 50 belonging to the wireless LANs 102, 103 can perform communication with the complex machines 10A to 10D belonging to the wireless LANs 102, 103 and the server apparatus 70 on the Internet 101, via the access points 102A, 103A.

In the meantime, the wireless communication via the access points 102A, 103A is not limited to the wireless communication that is performed in an entire area of a communication zone. That is, the description 'the portable terminal 50 wirelessly transmits or wirelessly receives information or data via the access points 102A, 103A' indicates that at least a wireless zone is preferably formed between the portable terminal 50 and the access point 102A, 103A. This is also the same for the complex machines 10A to 10D.

The complex machines 10A, 10B, 10C, 10D and the server apparatus 70 are allotted with apparatus IDs for uniquely identifying the respective apparatuses. In this illustrative embodiment, an apparatus ID of the complex machine 10A is "MFC-A", an apparatus ID of the complex machine 10B is "MFC-B", an apparatus ID of the complex machine 10C is "MFC-C", an apparatus ID of the complex machine 10D is "MFC-D", and an apparatus ID of the server apparatus 70 is "server A". The complex machines 10A, 10B, 10C, 10D and the server apparatus 70 are examples of the plurality of apparatuses. The apparatus ID is an example of the apparatus identification information.

The apparatus included in the cooperation system 100 is not limited to the complex machine 10 and the server apparatus 70, and may be a dedicated machine such as a FAX apparatus, a printer, a 3D printer, a label printer, a sewing machine, a machine tool, a scanner, a camera and the like. In the meantime, the complex machine 10 and server apparatus 70 of the specific examples of the apparatus are examples of the apparatus that can be any of a first apparatus and a second apparatus, which will be described later. Also, the FAX apparatus, the scanner and the camera are examples of the apparatus that can be only the first apparatus. The printer, the 3D printer, the label printer, the sewing machine and the machine tool are examples of the apparatus that can be only the second apparatus.

Complex Machine 10

Figure 2A:
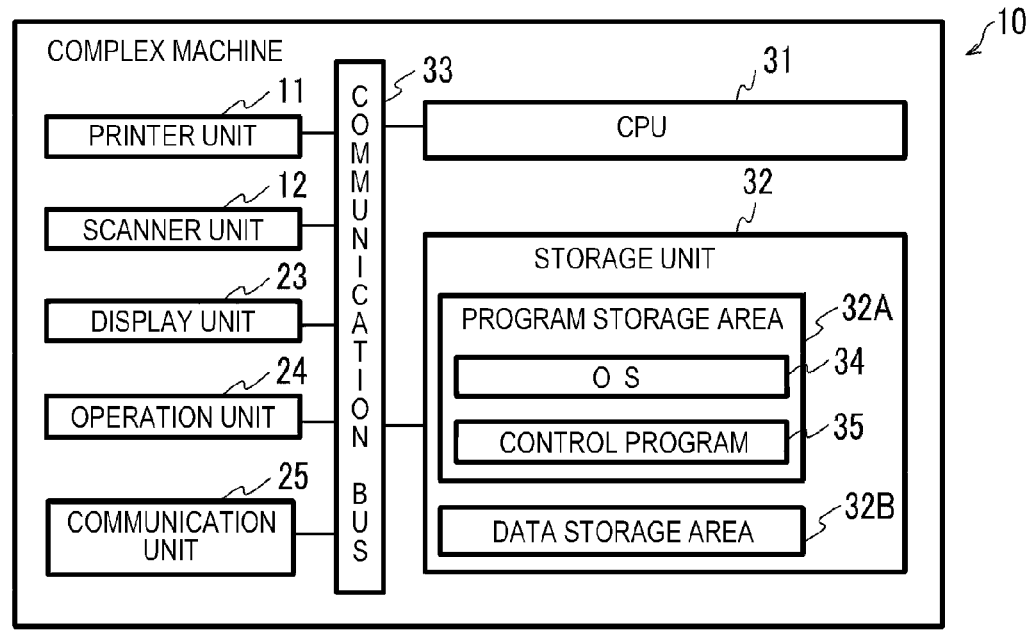
FIG. 2A is a block diagram of a complex machine 10.

As shown in FIG. 2A, the complex machine 10 mainly has a printer unit 11, a scanner unit 12, a display unit 23, an operation unit 24, a communication unit 25, a CPU (abbreviation of Central Processing Unit) 31, a storage unit 32 and a communication bus 33. The respective constitutional elements configuring the complex machine 10 are connected to each other via a communication bus 33. The configurations of the complex machines 10A, 10B, 10C may be common or may be partially different.

Printer Unit 11, Scanner Unit 12

The printer unit 11 is configured to execute recording processing of recording an image represented by image data onto a recording sheet. Although a recording method of the printer unit 11 is not particularly limited, a well-known method such as an inkjet method and an electrophotographic method may be adopted. The scanner unit 12 is configured to execute scan process of reading an image recorded on a recording sheet and generating image data. The complex machine 10 may further have a FAX function of transmitting and receiving facsimile data, a copy function of reading an image recorded on a recording sheet and recording the same onto another recording sheet, and the like.

Display Unit 23

The display unit 23 has a display screen for displaying a variety of information. Although a specific configuration of the display unit 23 is not particularly limited, an LCD (abbreviation of Liquid Crystal Display), an OLED (abbreviation of Organic Electro-Luminescence Display) and the like may be adopted.

Operation Unit 24

The operation unit 24 is configured to receive a user's operation of selecting an object displayed on the display screen of the display unit 23. Specifically, the operation unit 24 has push buttons, for example, and is configured to output a variety of operation signals associated with the pressed push buttons to the CPU 31. Further, the operation unit 24 may have a film-shaped touch sensor superimposed on the display screen of the display unit 23. That is, the display unit 23 may be configured as a touch panel display. As the touch sensor, a well-known method such as an electrostatic capacitance type, a resistance film type and the like may be adopted.

In the meantime, the term 'object' indicates an image that can be selected by a user's operation on the operation unit 24. For example, the object is a character string displayed on the display unit 23. When a direction key of the operation unit 24 is pressed, one of the objects may be highlighted, and when an enter button of the operation unit 24 is pressed, the highlighted object may be selected. As another example, when the operation unit 24 is configured as a touch panel, the object may be an icon, a button, a link and the like displayed on the display unit 23, and the object displayed on a tap position may be selected.

Communication Unit 25

The communication unit 25 is an interface for performing communication with an external apparatus through the communication network. In this illustrative embodiment, the communication unit 25 is configured to perform communication with an external apparatus, based on the TCP/IP (abbreviation of Transmission Control Protocol/Internet Protocol) protocol. That is, the complex machine 10 is configured to transmit a variety of information to the portable terminal 50 through the communication unit 25 and to receive a variety of data or information from the portable terminal 50 through the communication unit 25.

CPU 31

The CPU 31 is configured to control an entire operation of the complex machine 10. The CPU 31 is configured to acquire and execute a variety of programs (which will be described later) from the storage unit 32, based on the variety of information output from the operation unit 24 and the variety of information acquired from the external apparatus through the communication unit 25. That is, the CPU 31 and the storage unit 32 configure an example of the control unit.

Storage Unit 32

The storage unit 32 has a program storage area 32A and a data storage area 32B. The program storage area 32A is configured to store therein an OS (abbreviation of Operating System) 34 and a control program 35. In the meantime, the control program 35 may be a single program or a combination of a plurality of programs. The data storage area 32B is configured to store therein data or information, which is required to execute the control program 35.

In the meantime, the 'data' and 'information' in the specification have a common feature that 'data' and 'information' are bits or bit string, which can be handled by a computer. The term 'data' indicates that a semantic content represented by each bit can be handled by a computer without considering the semantic content. In contrast, the term 'information' indicates that an operation of the computer is branched by a semantic content represented by each bit. Further, the term 'instruction' indicates a control signal for urging an apparatus of a transmission destination to perform a next operation, and may include the information or may have a property as the information.

Also, the 'data' and 'information' are handled as the same data and information even though the formats (for example, a text format, a binary format, a flag format and the like) are changed for each computer, inasmuch as they are recognized as the same semantic content. For example, the information representing 'two' may be kept as information of a text format "0x32", which is the ASCII code, in one computer and may be kept as information of a binary format "10", which is the binary representation, in another computer.

Also, in the specification, the 'data' and 'information' before and after a predetermined calculation is applied thereto may be handled as the same data and information. For example, it is assumed that unencrypted key information is stored in the storage unit and encrypted key information (hereinafter, referred to as 'encrypted key information') is received through the communication unit 25. In this case, when the key information stored in the storage unit coincides with decrypted key information obtained by decrypting the encrypted key information, the key information, the encrypted key information and the decrypted key information may be handled as the same 'key information'. In the meantime, the predetermined calculation is not limited to encryption/decryption and may be a calculation using a Hash function, for example.

However, the distinction of the 'data' and 'information' is not strict, and an exceptional handling is also allowed. For example, the data may be temporarily handled as the information, and the information may be temporarily handled as the data. Also, one that is handled as the data in an apparatus may be handed as the information in another apparatus. Further, the information may be extracted from the data, and the data may be extracted from the information.

The storage unit 32 is configured by a RAM (abbreviation of Random Access Memory), a ROM (abbreviation of Read Only Memory), an EEPROM (abbreviation of Electrically Erasable Programmable Read-Only Memory), an HDD (abbreviation of Hard Disk Drive), a buffer provided for the CPU 31 or a combination thereof.

In the meantime, the storage unit 32 may be a computer-readable storage medium. The computer-readable storage medium is a non-transitory medium. The non-transitory medium includes a recording medium such as a CD-ROM and a DVD-ROM, too. Also, the non-transitory medium is a tangible medium. In the meantime, an electric signal for carrying a program to be downloaded from a server and the like on the Internet is a computer-readable signal medium, which is one kind of the computer-readable medium, but is not included in the non-transitory computer-readable storage medium.

The program stored in the program storage area 32A is configured to be executed by the CPU 31. However, in the specification, the operations of each program may be described while omitting the CPU 31. That is, in below descriptions, the description 'program A is configured to execute processing A' may indicate that 'CPU 31 is configured to execute processing A described in the program A'. This is also the same for the portable terminal 50 and server apparatus 70, which will be described later.

The OS 34 is a basic program for providing an API (abbreviation of Application Programming Interface) configured to control the printer unit 11, the scanner unit 12, the display unit 23, the operation unit 24, the communication unit 25 and the like, which are the hardware configuring the complex machine 10. That is, each program described above is configured to call the API provided by the OS 34, thereby controlling the respective hardware. However, in the specification, the operations of each program are described while omitting the OS 34. That is, in below descriptions, the description 'program B is configured to control hardware C' may indicate that 'program B is configured to control hardware C through the API of the OS 34'. This is also the same for the portable terminal 50 and server apparatus 70, which will be described later.

Portable Terminal 50

Figure 2B:
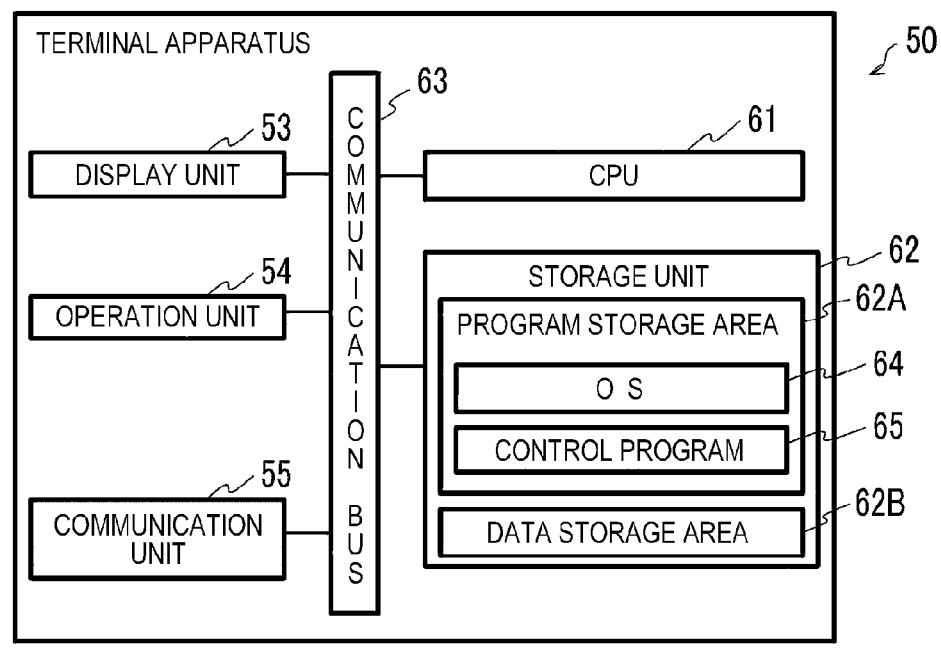
FIG. 2B is a block diagram of a portable terminal 50.

As shown in FIG. 2B, the portable terminal 50 mainly has a display unit 53, an operation unit 54, a communication unit 55, a CPU 61, a storage unit 62 and a communication bus 63. Since the display unit 53, the operation unit 54, the communication unit 55, the CPU 61, the storage unit 62 and the communication bus 63, which are included in the portable terminal 50, are common to the display unit 23, the operation unit 24, the communication unit 25, the CPU 31, the storage unit 32 and the communication bus 33, which are included in the complex machine 10, the overlapping descriptions are omitted. The CPU 61 and the storage unit 62 configure an example of the control unit. The portable terminal 50 is an example of the information processing apparatus. However, the specific example of the information processing apparatus is not limited to the portable terminal 50 such as a smart phone, a portable phone and a tablet terminal, and may be a PC (abbreviation of Personal Computer) and the like.

The communication unit 55 is configured to perform wireless communication with the complex machines 10A, 10B, 10C, 10D belonging to the wireless LANs 102, 103 and to perform wireless communication with the server apparatus 70 on the Internet 101 via the access points 102A, 103A. That is, the portable terminal 50 is configured to wirelessly transmit a variety of data or information to the complex machine 10 or server apparatus 70 through the communication unit 55 and to wirelessly receive the variety of data or information from the complex machine 10 or server apparatus 70 through the communication unit 55. Here, it is assumed that when the portable terminal 50 is arranged in the hatched area of FIG. 1, the communication unit 55 of the portable terminal 50 can be connected to any of the access points 102A, 103A. However, the communication unit 55 cannot be connected to the access points 102A, 103A at the same time.

The data storage area 62B of the storage unit 62 can store therein a cooperation operation list. The cooperation operation list is a list for defining a cooperation operation of causing a first apparatus to execute a first operation and a second apparatus to execute a second operation after the first operation. For example, as shown in FIGS. 3A and 3B, in the cooperation operation list, a first apparatus and a second apparatus selected from a plurality of apparatuses are associated with apparatus IDs for identifying the apparatuses, operation contents to be executed by the apparatuses and SSIDs for performing wireless communication with the apparatuses. The cooperation operation list is an example of the cooperation operation information.

The cooperation operation list shown in FIG. 3A indicates that the server apparatus 70 identified with an apparatus ID "server A" is caused to execute a first operation "DL" and the complex machine 10A identified with an apparatus ID "MFC-A" is caused to execute a second operation "PRINT". In FIG. 3A, the server apparatus 70 is an example of the first apparatus, and the complex machine 10A is an example of the second apparatus. Also, the cooperation operation list shown in FIG. 3B indicates that the complex machine 10A identified with an apparatus ID "MFC-A" is caused to execute a first operation "SCAN" and the complex machine 10B identified with an apparatus ID "MFC-B" is caused to execute a second operation "PRINT". In FIG. 3B, the complex machine 10A is an example of the first apparatus, and the complex machine 10B is an example of the second apparatus.

The operation content "DL" associated with the server apparatus 70 indicates a first operation of transmitting the target data stored in the server apparatus 70 to the portable terminal 50. The operation content "SCAN" associated with the complex machine 10A indicates a first operation of causing the scanner unit 12 to execute the scan processing and transmitting the target data generated in the scan processing to the portable terminal 50. The operation content "PRINT" associated with the complex machines 10A, 10B indicates a second operation of receiving the target data from the portable terminal 50 and causing the printer unit 11 to execute recording processing of the target data. The first operation is an operation including the transmission of the target data to the portable terminal 50. The second operation is an operation including the reception of the target data from the portable terminal 50.

In the meantime, although not shown, the operation content included in the cooperation operation list may include more detailed content (hereinafter, referred to as 'setting information'). For example, the operation content "DL" may be added with a data ID of the target data, which is a downloading target, and the like. Also, the operation content "SCAN" may be added with a document size indicating a size of a document, information indicating a color scan or monochrome scan, information indicating a duplex scan or one-sided scan, and the like. Further, the operation content "PRINT" may be added with information indicating a size of a recording sheet, information indicating a number of the recording sheets, information indicating a number of images to be included on one recording sheet, information indicating a duplex print or one-sided print, and the like.

Regarding the SSID, the SSIDs set for the access points 102A, 103A of the wireless LANs 102, 103 to which the corresponding apparatuses belong are set. That is, the complex machines 10A, 10B identified with the apparatus ID "MFC-A" and apparatus ID "MFC-B" are associated with the SSID "abc". In the meantime, the SSID corresponding to the server apparatus 70 on the Internet is blank.

The cooperation operation list can be arbitrarily prepared and edited by the user of the portable terminal 50. The portable terminal 50 may receive new registration and editing of the cooperation operation list by the user through the display unit 53 and the operation unit 54, for example. A specific using method of the new registration and editing of the cooperation operation list will be described later with reference to FIG. 6. Also, a plurality of the cooperation operation lists can be stored in the data storage area 62B. For this reason, the cooperation operation list stored in the data storage area 62B is allotted with a cooperation operation ID for identifying the cooperation operation list. In this illustrative embodiment, the cooperation operation list shown in FIG. 3A is allotted with a cooperation operation ID "001" and the cooperation operation list shown in FIG. 3B is allotted with a cooperation operation ID "002".

As shown in FIG. 3C, the data storage area 62B is configured to associate and store therein the apparatus ID and the target data. More specifically, the data storage area 62B shown in FIG. 3C is configured to associate and store therein the target data received from the first apparatus and the apparatus ID of the second apparatus, which is a transmission destination of the target data. In the meantime, the specific processing of storing the apparatus ID and target data in the data storage area 62B shown in FIG. 3C will be described later with reference to FIG. 4.

Further, as shown in FIG. 3D, the data storage area 62B can associate and store therein the apparatus ID, the SSID, the first operation and the second operation. The SSID is SSIDs of the access points 102A, 103A of the wireless LANs 102, 103 to which the apparatuses identified with the corresponding apparatus IDs belong. The first operation and second operation indicate operations that can be executed by an apparatus identified with the corresponding apparatus ID. Meanwhile, in this illustrative embodiment, it is assumed that an apparatus ID "server A" of the server apparatus 70 is already stored in the data storage area 62B shown in FIG. 3D at the time that the control program 65 is installed in the portable terminal 50. In the meantime, the processing of storing the apparatus ID "MFC-A" and apparatus ID "MFC-B" in the data storage area 62B shown in FIG. 3D will be described later with reference to FIG. 6.

Server Apparatus 70

The server apparatus 70 is a storage server configured to store therein data, for example. Although the specific example of the server apparatus 70 is not particularly limited, the server apparatus 70 is an apparatus configured to provide services such as 'Dropbox (registered trademark)', 'Google Docs (registered trademark)', 'Evernote (registered trademark)' and the like. Also, the present invention is not limited to the configuration where the server apparatus 70 is connected to the Internet 101, and the server apparatus 70 may be a local storage server belonging to the wireless LANs 102, 103.

Cooperation Operation Control Processing

Figure 4:
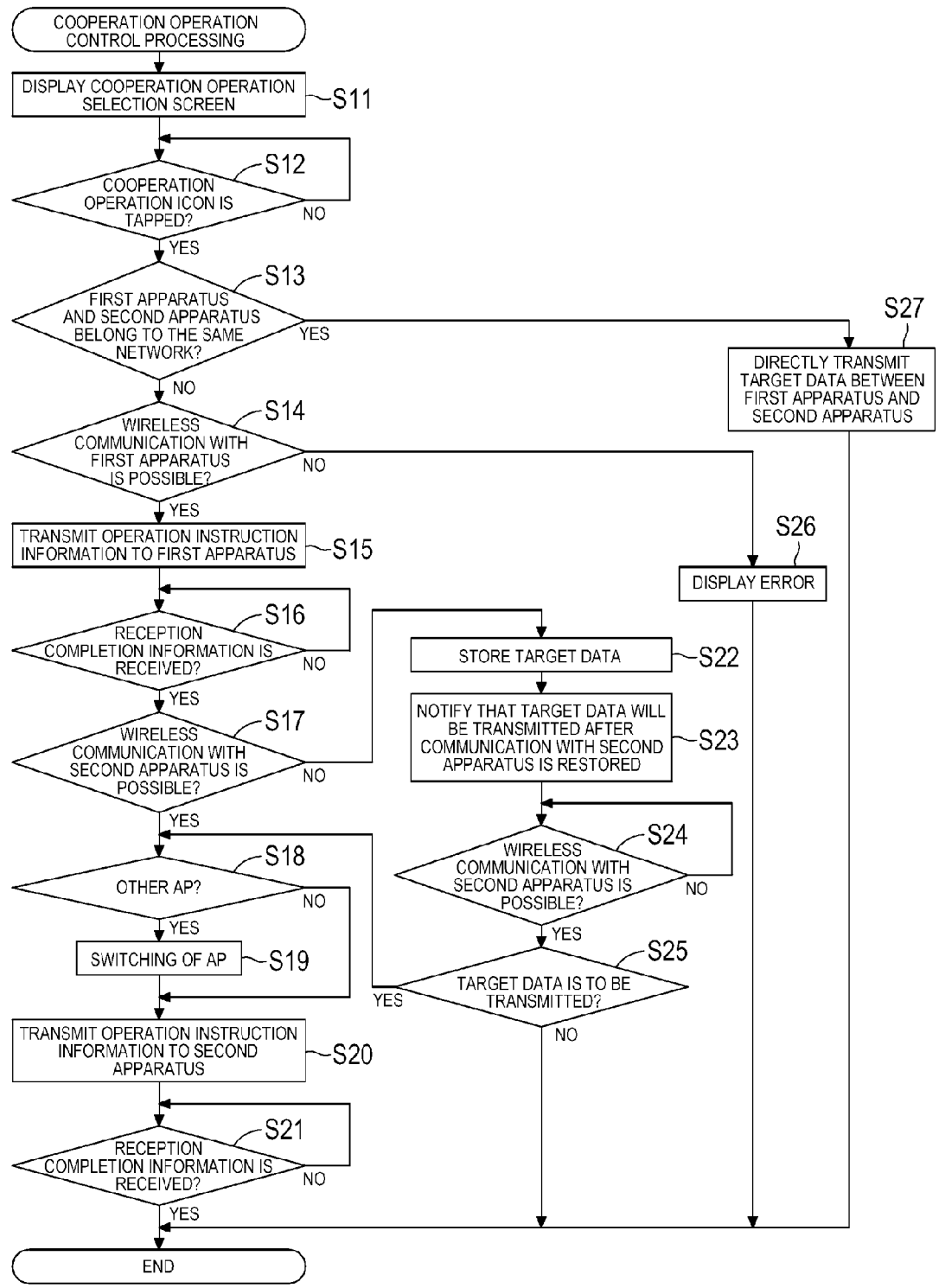
FIG. 4 is a flowchart of cooperation operation control processing that is executed by a control program 65 of the portable terminal 50.

The cooperation operation control processing that is executed by the control program 65 of the portable terminal 50 is described with reference to FIG. 4. The cooperation operation control processing is processing of, when it is not possible to perform wireless communication with the second apparatus, storing the target data received from the first apparatus in the data storage area 62B, and when it becomes possible to perform wireless communication with the second apparatus, wirelessly transmitting the target data to the second apparatus. Meanwhile, in this illustrative embodiment, it is assumed that the portable terminal 50 is arranged in the hatched area of FIG. 1 and the communication unit 55 is connected to the access point 103A.

Figure 7B:
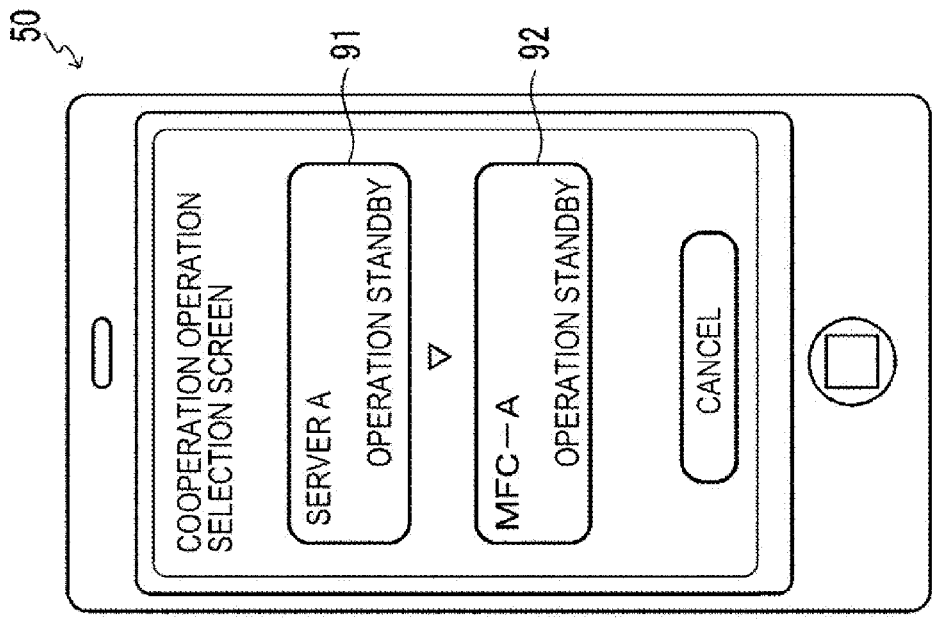
Figure 7A:
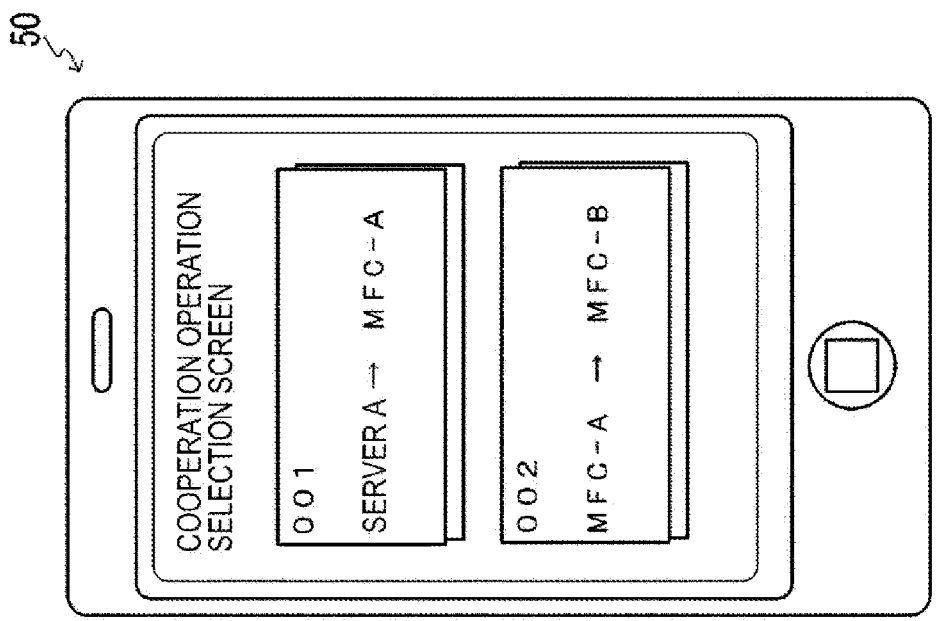

First, the control program 65 of the portable terminal 50 displays a cooperation operation selection screen on the display unit 53 (S11). FIG. 7A illustrates an example of the cooperation operation selection screen. The cooperation operation selection screen shown in FIG. 7A includes cooperation operation icons indicating one or more cooperation operations stored in the data storage area 62B. The cooperation operation icon is denoted with a cooperation operation ID for identifying the cooperation operation list stored in the data storage area 62B.

Then, when the operation unit 54 receives a user's operation of tapping a position of the cooperation operation icon corresponding to the cooperation operation list shown in FIG. 3A (S12: Yes), the control program 65 displays a cooperation operation screen on the display unit 53. FIG. 7B illustrates an example of the cooperation operation screen. The cooperation operation screen shown in FIG. 7B includes status images 91, 92 corresponding to the first apparatus and second apparatus included in the cooperation operation list, a cancel icon for receiving an instruction to stop the cooperation operation. The processing of step S12 is an example of the reception processing of receiving a start instruction to start the cooperation operation.

In the status images 91, 92, the apparatus IDs included in the cooperation operation list and progressing statuses of operations that are executed by the apparatuses identified by the apparatus IDs are indicated. That is, the information indicated in the status images 91, 92 is changed as the cooperation operation progresses. Also, the status images 91, 92 are arranged in accordance with an execution sequence of the cooperation operation list. In the cooperation operation screen shown in FIG. 7B, the status image 91 represents a progressing status of the first operation "DL" that is executed by the server apparatus 70 identified with the apparatus ID "server A". The status image 92 represents a progressing status of the second operation "PRINT" that is executed by the complex machine 10A identified with the apparatus ID "MFC-A".

Then, the control program 65 determines whether the first apparatus and second apparatus registered in the cooperation operation list belong to the same communication network (S13). The control program 65 may determine whether the first apparatus and second apparatus belong to the same network by comparing the SSIDs of the cooperation operation list, for example. In this illustrative embodiment, the server apparatus 70, which is the first apparatus, is arranged on the Internet 101, and the complex machine 10A, which is the second apparatus, belongs to the wireless LAN 102. That is, in this illustrative embodiment, the first apparatus and the second apparatus belong to the different communication networks.

Then, when the server apparatus 70 and the complex machine 10A belong to the different communication networks (S13: No), the control program 65 determines whether it is possible to perform wireless communication with the server apparatus 70 (S14). The case where it is possible to perform wireless communication with the server apparatus 70 on the Internet 101 is a case where it is possible to connect the communication unit 55 to the access points 102A, 103A of the wireless LANs 102, 103 connected to the Internet 101, for example. The case where it is possible to connect the communication unit 55 to the access points 102A, 103A is a case where the communication unit 55 can receive the beacon signals transmitted from the access points 102A, 103A.

That is, in step S14, the condition that the communication unit 55 is already connected to the access points 102A, 103A is not required, and a condition that the communication unit 55 is connected to the access points 102A, 103A is preferably satisfied. This is also the same for steps S17, S24, which will be described later. When it is determined that the communication unit 55 is not connected to any of the access points 102A, 103A yet and that the communication unit 55 can be connected to any one of the access points 102A, 103A, the control program 65 executes the above connection processing.

Then, when it is determined that it is possible to perform wireless communication with the server apparatus 70 (S14: Yes), the control program 65 wirelessly transmits operation instruction information to the server apparatus 70 through the communication unit 55 (S15). The operation instruction information is information for causing an apparatus of a transmission destination to execute a corresponding operation. The processing of step S15 and step S20, which will be described later, is an example of the operation instruction processing. Also, the control program 65 changes the progressing status of the status image 91 on the cooperation operation screen from "operation standby" to "being operating".

Then, the control program 65 holds execution of next processing and thereafter until transmission completion information is wirelessly received from the server apparatus 70 through the communication unit 55 (S16: No). Also, the control program 65 sequentially wirelessly receives the target data divided in plural from the server apparatus 70 through the communication unit 55 and stores the same in the data storage area 62B until the transmission completion information is wirelessly received from the server apparatus 70 through the communication unit 55 (S16: No). In the meantime, the target data described here may be stored in the RAM because it has only to store the target data only until the target data is completely received. The processing of wirelessly receiving the target data from the server apparatus 70 is an example of the reception processing.

The transmission completion information is information indicating the transmission completion of the target data to the portable terminal 50 of the first operation that is to be executed by the first apparatus. That is, when the transmission completion information is received from the first apparatus through the communication unit 55, the control program 65 determines that the target data is completely received from the first apparatus. Although the specific example of the transmission completion information is not particularly limited, it may be a packet in which "ON" is set in a FIN flag of a TCP header, for example.

Then, when the transmission completion information is received from the server apparatus 70 through the communication unit 55 (S16: Yes), the control program 65 determines whether it is possible to perform wireless communication with the complex machine 10A, which is the second apparatus (S17). The case where it is possible to perform wireless communication with the complex machine 10A belonging to the wireless LAN 102 is a case where the communication unit 55 can receive the beacon signal transmitted from the access point 102A, like step S14, for example. The processing of step S17 is an example of the first determination processing. Also, the control program 65 changes the progressing status of the status image 91 on the cooperation operation screen from "being operating" to "operation completed".

Then, when it is determined that it is possible to perform wireless communication with the complex machine 10 (S17: Yes), the control program 65 determines whether the access point 103A, to which the communication unit 55 is currently connected, is the same as the access point 102A of the wireless LAN 102 to which the complex machine 10A belongs (S18). When it is determined that the communication unit 55 is not connected to the access point 102A of the wireless LAN 102 to which the complex machine 10A belongs (S18: Yes), the control program 65 switches a connection destination of the communication unit 55 to the access point 102A (S19). On the other hand, when it is determined that the communication unit 55 is already connected to the access point 102A of the wireless LAN 102 to which the complex machine 10A belongs (S18: No), the control program 65 skips over step S19.

For example, in step S19, the control program 65 ends the connection between the communication unit 55 and the access point 103A, and wirelessly transmits a connection request, in response to the beacon signal transmitted from the access point 102A. Thereby, the connection destination of the communication unit 55 is switched from the access point 103A to the access point 102A. The processing of step S19, which is executed after the reception processing is completed (S16: Yes) and before the transmission processing starts (S20), is an example of the connection switching processing. Also, the wireless LAN 103 is an example of the first communication network, and the wireless LAN 102 is an example of the second communication network.

Then, the control program 65 wirelessly transmits the operation instruction information to the complex machine 10A through the communication unit 55 (S20). Also, the control program 65 changes the progressing status of the status image 92 on the cooperation operation screen from "operation standby" to "being operating". Further, the control program 65 sequentially wirelessly transmits the target data divided in plural to the complex machine 10A through the communication unit 55 until the reception completion information is wirelessly received from the complex machine 10A through the communication unit 55 (S21: No). The processing of, when it is determined in step S17 that it is possible to perform wireless communication with the complex machine 10A, wirelessly transmitting the target data to the complex machine 10A is an example of the direct transmission processing.

The reception completion information is information indicating the reception completion of the target data from the portable terminal 50 of the second operation. That is, when the reception completion information is received from the complex machine 10A through the communication unit 55 (S21: Yes), the control program 65 determines that the transmission of the target data to the complex machine 10A is completed, and ends the cooperation operation control processing. Although the specific example of the reception completion information is not particularly limited, it may be a packet in which "ON" is set for a FIN flag and an ACK flag of the TCP header, for example.

When it is determined that it is not possible to perform wireless communication with the complex machine 10A, which is the second apparatus (S17: No), the control program 65 associates the target data received from the server apparatus 70 with the apparatus ID "MFC-A" of the complex machine 10A and stores the same in the data storage area 62B shown in FIG. 3C (S22). In the meantime, since it is necessary to continuously store the target data in step S22 until it is possible to perform wireless communication with the complex machine 10A, the target data is preferably stored in the EEPROM, for example. The processing of step S22 is an example of the storing control processing. In the meantime, the case where the portable terminal 50 cannot perform wireless communication with the complex machine 10A is a case where the portable terminal 50 or complex machine 10A cannot connect to the access point 102A, a case where a power supply of the complex machine 10A is off, and the like.

Figure 8A:
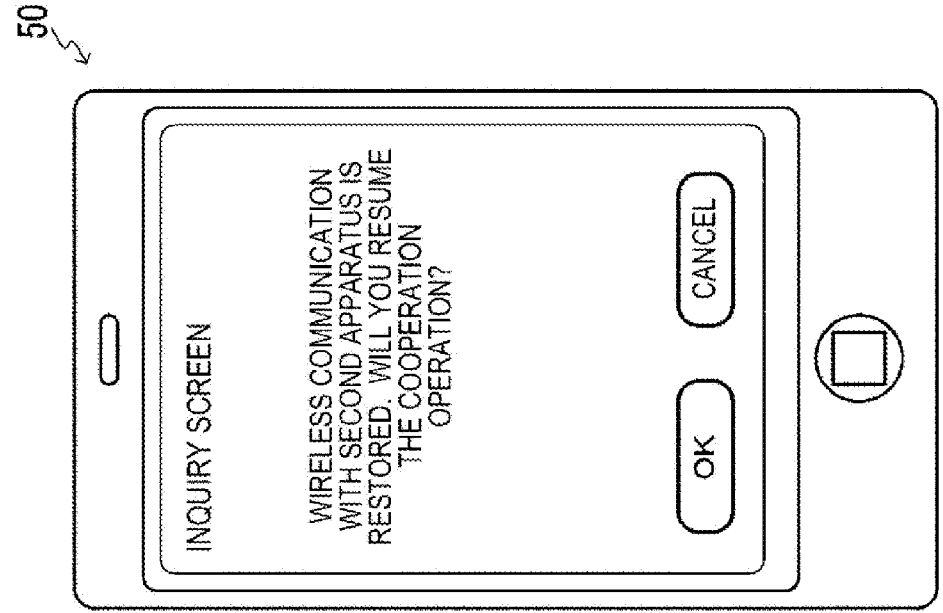

Then, the control program 65 displays a notification screen on the display unit 53 (S23). FIG. 8A illustrates an example of the notification screen. The notification screen shown in FIG. 8A includes a message 'Since it is not possible to perform wireless communication with the second apparatus, the cooperation operation cannot be continues. The cooperation operation will be resumed after the wireless communication with the second apparatus is restored' and an OK icon. In the meantime, the method of notifying the message is not limited to the display on the display unit 53. For example, a guide sound may be output from a speaker (not shown) mounted to the portable terminal 50. The processing of step S23 is an example of the notification processing.

Then, when the operation unit 54 receives a user's operation of tapping a position of the OK button on the notification screen, the control program 65 holds execution of next processing and thereafter until it becomes possible to perform wireless communication with the complex machine 10A (S24). The determination of determining whether the portable terminal 50 and the complex machine 10A can perform wireless communication with each other may be common to step S17, for example. The processing of step S23, which is executed after the storing control processing (S22), is an example of the second determination processing.

Figure 8B:
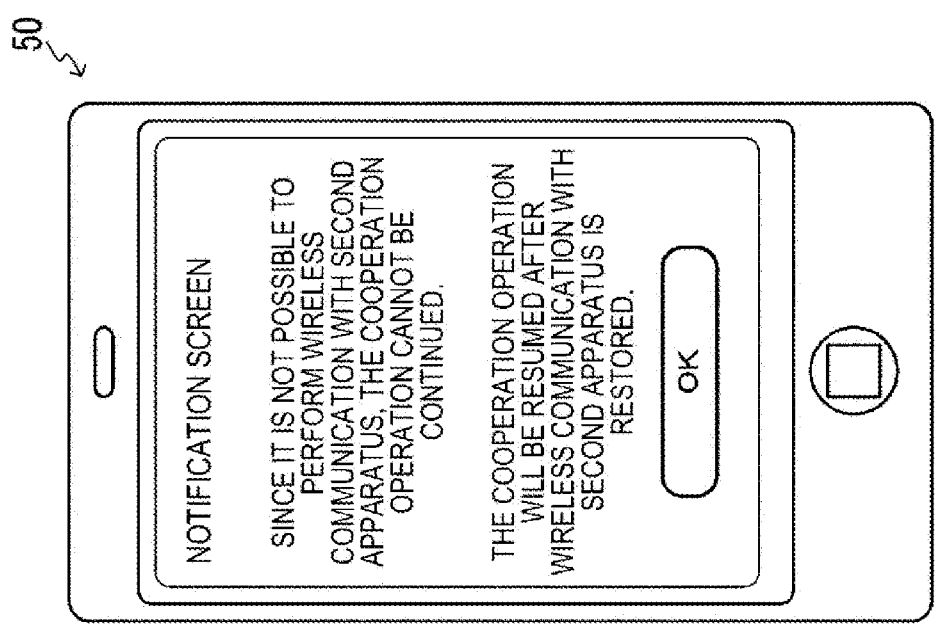

When it becomes possible to perform wireless communication with the complex machine 10A (S24: Yes), the control program 65 asks the user whether to wirelessly transmit the target data stored in the data storage area 62B, which is shown in FIG. 3C, to the complex machine 10A through the communication unit 55 (S25). In step S25, the control program 65 may display an inquiry screen on the display unit 53, for example. FIG. 8B illustrates an example of the inquiry screen. The inquiry screen shown in FIG. 8B includes a message 'Wireless communication with the second apparatus is restored. Will you resume the cooperation operation?', an OK icon and a cancel icon. The processing of step S25 is an example of the inquiry processing.

Then, when the operation unit 54 receives a user's operation of tapping a position of the OK button on the inquiry screen (S25: Yes), the control program 65 executes processing of step S18 and thereafter. The processing of steps S18 to S21 is different from the above descriptions, in that the target data stored in the data storage area 62B in association with the apparatus ID "MFC-A" of the complex machine 10A is transmitted, and the others are common to the above descriptions. The tap located at the position of the OK button on the inquiry screen is an example of the execution instruction indicating the execution of the transmission processing. The processing of, when it is determined in step S24 that it is possible to perform wireless communication with the complex machine 10A, wirelessly transmitting the target data to the complex machine 10A, is an example of the transmission processing.

On the other hand, when the operation unit 54 receives a user's operation of tapping a position of the cancel icon on the inquiry screen (S25: No), the control program 65 ends the cooperation operation control processing. Also, when a time period for which the control program 65 stands by in step S24 until the processing is executed exceeds a threshold time period, the control program 65 may end the cooperation operation control processing. In the meantime, when ending the cooperation operation control processing, the control program 65 deletes the target data and apparatus ID stored in the data storage area 62B in step S22.

Figure 9B:
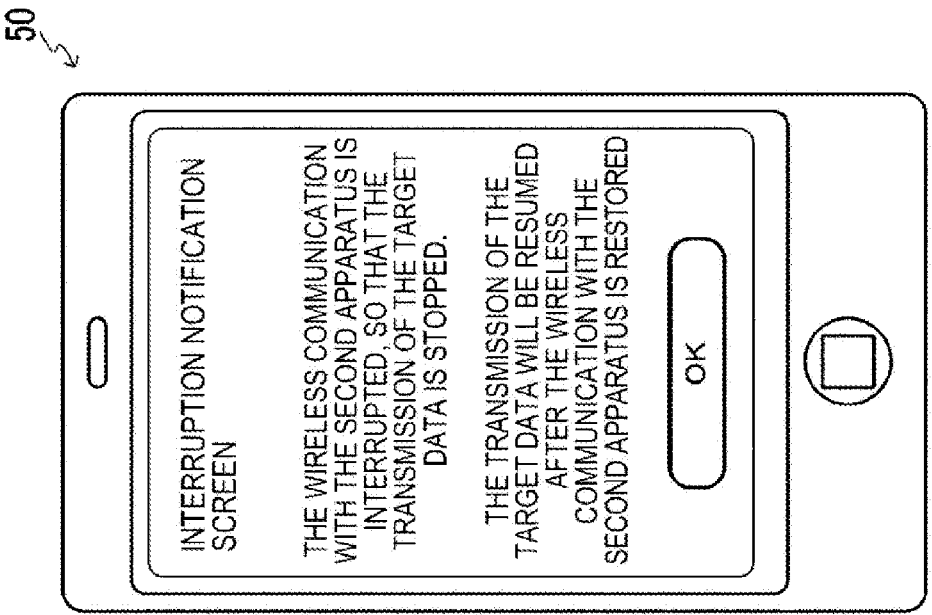
Figure 9A:
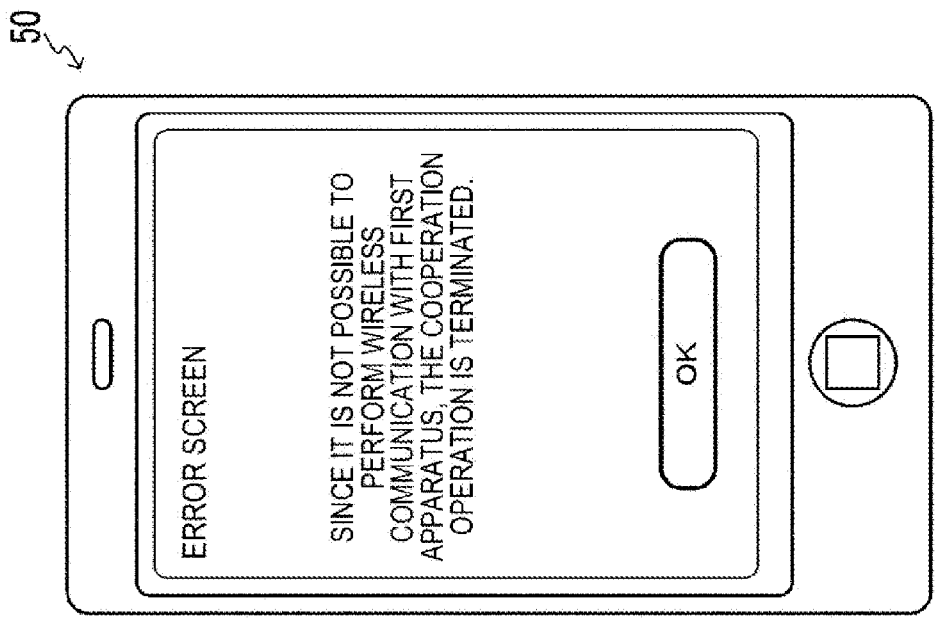

When it is not possible to perform wireless communication with the server apparatus 70 on the Internet 101 (S14: No), the control program 65 displays an error screen on the display unit 53 (S26). FIG. 9A illustrates an example of the error screen. The error screen shown in FIG. 9A includes a message 'Since it is not possible to perform wireless communication with the first apparatus, the cooperation operation is over.' and an OK icon. When the operation unit 54 receives a user's operation of tapping a position of the OK icon on the error screen, the control program 65 ends the cooperation operation control processing.

Further, when the operation unit 54 receives a user's operation of tapping the position of the cooperation operation icon corresponding to the cooperation operation list shown in FIG. 3B on the cooperation operation selection screen shown in FIG. 7A (S12: Yes), the control program 65 determines that the complex machine 10A and complex machine 10B registered in the cooperation operation list belong to the same communication network (S13: Yes). Then, the control program 65 causes the complex machine 10A to transmit the target data to the complex machine 10B (S27), and ends the cooperation operation control processing. The processing of step S26 is an example of the transmission and reception control processing.

In step S27, the control program 65 adds location information indicating a location of the complex machine 10B, which is a transmission destination of the target data, to the operation instruction information for causing the complex machine 10A to execute the first operation. Although the specific example of the location information is not particularly limited, it may be an IP address allotted to the complex machine 10B, for example. Thereby, the complex machine 10A, which is the first apparatus, transmits the target data generated by the first operation "SCAN" to the complex machine 10B through the communication unit 25. In the meantime, the complex machine 10B, which is the second apparatus, executes the second operation "PRINT", in response to the target data received from the complex machine 10A through the communication unit 25.

Meanwhile, the description 'the target data is transmitted from the complex machine 10A to the complex machine 10B in step S27' indicates that the target data is transmitted from the complex machine 10A to the complex machine 10B without via the portable terminal 50, for example, and the corresponding configuration does not limit a configuration where the access point 102A, a switching hub and the like are interposed between the complex machine 10A and the complex machine 10B. In other words, an IP address of the complex machine 10B included in the operation instruction information is preferably set in a transmission destination IP address of an IP packet including the target data, which is transmitted from the complex machine 10A. Also, at the time of step S27, when the communication unit 55 of the portable terminal 50 is not connected to the access point 102A of the wireless LAN 102 to which the complex machines 10A, 10B belong, the connection destination of the communication unit 55 is switched by the processing of step S19.

Resumption Processing

Figure 5:
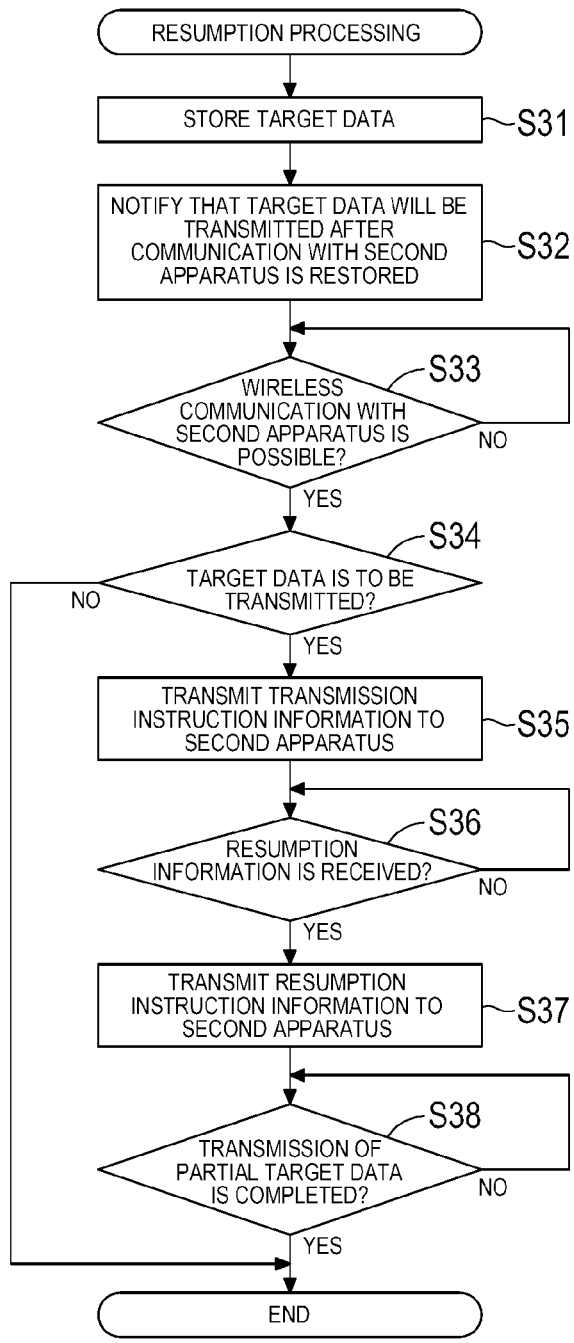
FIG. 5 is a flowchart of resumption processing that is executed by the control program 65 of the portable terminal 50.

Subsequently, resumption processing that is executed by the control program 65 of the portable terminal 50 is described with reference to FIG. 5. The resumption processing is processing of, when it is not possible to perform wireless communication with the second apparatus during the transmission of the target data, storing the target data in the data storage area 62B, and when it is again possible to perform wireless communication with the second apparatus, resuming the transmission of the target data. In the meantime, the descriptions about the processing common to the cooperation operation control processing shown in FIG. 4 are omitted, and the differences are described.

In below descriptions, the cooperation operation is executed in accordance with the cooperation operation list shown in FIG. 3A. Also, it is assumed that the target data includes a plurality of images to be recorded on each of a plurality of recording sheets. Further, it is assumed that the second operation "PRINT", which is executed by the complex machine 10B, is to sequentially record a plurality of images represented by the target data on the recording sheets. The control program 65 of the portable terminal 50 executes the resumption processing shown in FIG. 5, when it is not possible to perform wireless communication with the complex machine 10B after the operation instruction information is transmitted to the complex machine 10B through the communication unit 55 (S20) until the reception completion information is wirelessly received from the complex machine 10B through the communication unit 55 (S21: No).

First, when it is not possible to perform wireless communication with the complex machine 10B, the control program 65 associates the target data under transmission with the apparatus ID "MFC-B" of the complex machine 10B, which is a transmission destination of the target data, and stores the same in the data storage area 62B shown in FIG. 3C (S31). The processing of step S31 may be common to the processing of step S22 shown in FIG. 4, for example. That is, the processing of step S31 is another example of the storing control processing.

Then, the control program 65 displays an interruption notification screen on the display unit 53 (S32). FIG. 9B illustrates an example of the interruption notification screen. The interruption notification screen shown in FIG. 9B includes a message 'The wireless communication with the second apparatus is interrupted, so that the transmission of the target data is stopped. The transmission of the target data will be resumed after the wireless communication with the second apparatus is restored' and an OK icon. The processing of step S32 may be common to the processing of step S23 shown in FIG. 4, for example. That is, the processing of step S32 is another example of the notification processing.

Then, when the operation unit 54 receives a user's operation of tapping a position of the OK icon on the interruption notification screen, the control program 65 holds execution of next processing and thereafter until it becomes possible to perform wireless communication with the complex machine 10B (S33). The processing of step S33 may be common to the processing of step S24 shown in FIG. 4, for example. That is, the processing of step S33 is another example of the second determination processing.

Then, when it becomes possible to perform wireless communication with the complex machine 10B (S33: Yes), the control program 65 asks the user whether or not to wirelessly transmit the target data stored in the data storage area 62B shown in FIG. 3C to the complex machine 10B through the communication unit 55 (S34). The processing of step S34 may be common to the processing of step S25 shown in FIG. 4, for example. That is, the processing of step S34 is another example of the inquiry processing.

Then, when the operation unit 54 receives a user's operation of tapping a position of the OK icon on the inquiry screen (S34: Yes), the control program 65 wirelessly transmits transmission instruction information to the complex machine 10B through the communication unit 55 (S35). The transmission instruction information is information for transmitting resumption information to the complex machine 10B, which is a transmission destination. The resumption information is information for specifying a resumption image of a plurality of images, which is to be recorded on a next recording sheet. In the meantime, the resumption information may be any information inasmuch as it can specify a resumption image, for example, information for specifying an image finally recorded on the recording sheet. The processing of step S35 is an example of the transmission instruction processing.

Then, when the resumption information is received from the complex machine 10B through the communication unit 55 (S36: Yes), the control program 65 wirelessly transmits resumption instruction information to the complex machine 10B through the communication unit 55 (S37). The resumption instruction information is information for resuming the operation interrupted in the apparatus of the transmission destination. Then, the control program 65 wirelessly transmits partial target data to the complex machine 10B through the communication unit 55 (S38). The partial target data is data after the resumption image, which is represented by the resumption information, of the target data stored in the data storage area 62B shown in FIG. 3C in association with the apparatus ID "MFC-B". The processing of step S38 is an example of the partial transmission processing.

When the transmission of the partial target data is completed (S38: Yes), the control program 65 ends the resumption processing. Also, when the operation unit 54 receives a user's operation of tapping a position of the cancel icon on the inquiry screen (S34: No), the control program 65 skips over steps S34 to S38 and ends the resumption processing. In the meantime, when ending the resumption processing, the control program 65 deletes the target data and apparatus ID stored in the data storage area 62B in step S31.

Device Selection Processing

Figure 6:
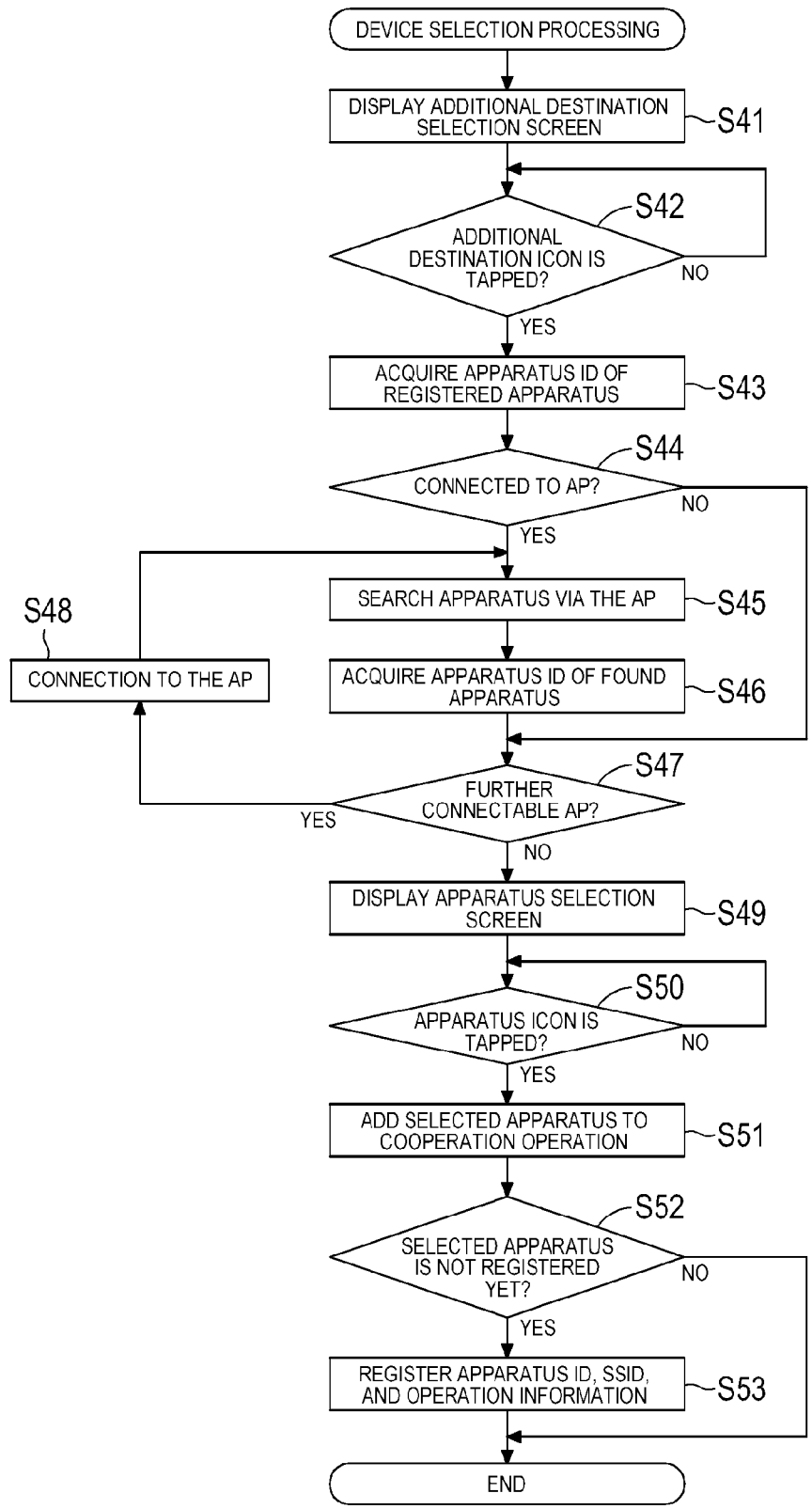
FIG. 6 is a flowchart of device selection processing that is executed by the control program 65 of the portable terminal 50.

Subsequently, device selection processing that is executed by the control program 65 of the portable terminal 50 is described with reference to FIG. 6. The device selection processing is processing of selecting the first apparatus and second apparatus which are to execute the cooperation operation. In other words, the device selection processing is processing of newly registering the cooperation operation list in the data storage area 62B. When the operation unit 54 receives a user's operation of tapping a position of a 'new registration' icon on a menu screen (not shown) displayed on the display unit 53, the control program 65 executes the device selection processing shown in FIG. 6.

Figure 10B:
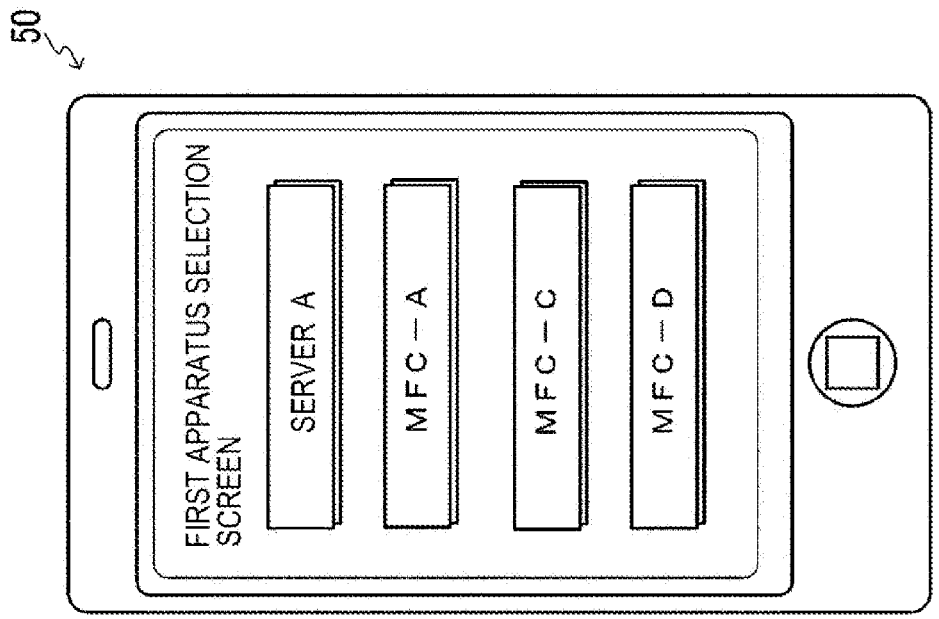
Figure 10A:
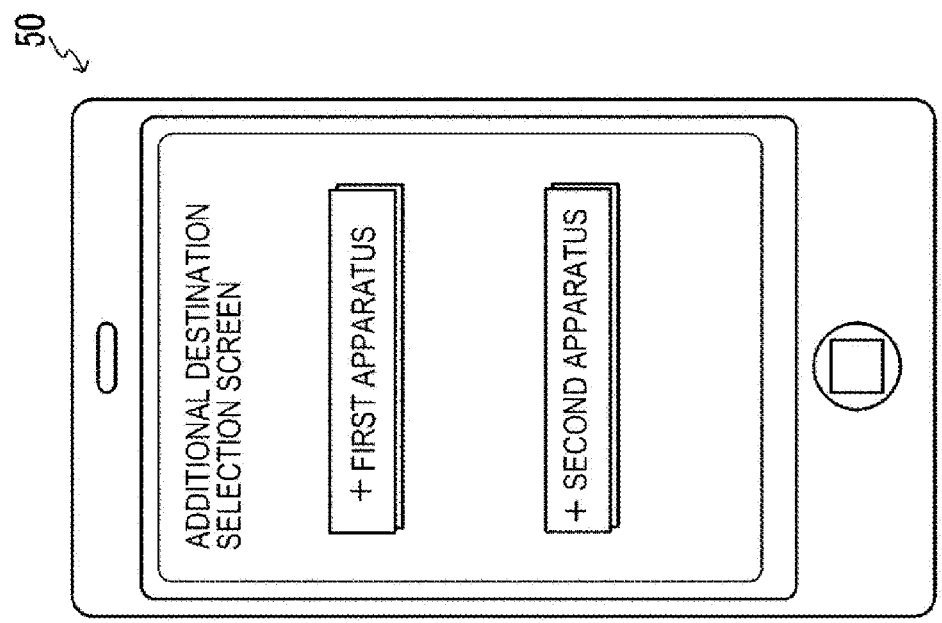

First, the control program 65 displays an additional destination selection screen on the display unit 53 (S41). FIG. 10A illustrates an example of the additional destination selection screen. The additional destination selection screen shown in FIG. 10A includes a '+first apparatus' icon for receiving selection of the first apparatus and a '+second apparatus' icon for receiving selection of the second apparatus. Meanwhile, in FIG. 6, the '+first apparatus' icon and '+second apparatus' icon are collectively denoted as 'additional destination icon'.

Then, when the operation unit 54 receives a user's operation of tapping a position of the '+first apparatus' icon on the additional destination selection screen (S42: Yes), the control program 65 acquires the apparatus ID of the apparatus IDs stored in the data storage area 62B shown in FIG. 3D, which is associated with the first operation (S43). In the meantime, in step S43, the control program 65 acquires the apparatus ID associated with the first operation, irrespective of whether the communication unit 55 is connected to the access point that can be connected with the SSID corresponding to the apparatus ID. In the example of FIG. 3D, the apparatus ID "server A" and apparatus ID "MFC-A" associated with the first operation are acquired, and the apparatus ID "MFC-B" with which the first operation is not associated is not acquired.

Then, the control program 65 determines whether the communication unit 55 is connected to any one of the access points 102A, 103A (S44). When the communication unit 55 is already connected to the access point 102A (S44: Yes), the control program 65 searches an apparatus capable of performing wireless communication through the access point 102A, i.e., an apparatus belonging to the wireless LAN 102 (S45). Since the method of searching the apparatus in the wireless LAN 102 has been already well known, the descriptions thereof are omitted.

The control program 65 receives operation information, which indicates an operation that can be executed by the apparatus found in step S45, from the corresponding apparatus through the communication unit 55. In the example of FIG. 1, the complex machines 10A, 10B belonging to the wireless LAN 102 are found. Also, it is assumed that the operation information acquired from the complex machine 10A indicates the first operation "SCAN" and the second operation "PRINT". Further, it is assumed that the operation information acquired from the complex machine 10B indicates the second operation "PRINT".

Then, the control program 65 acquires an apparatus ID of the apparatus found in step S45 (S46). At this time, the apparatus ID overlapping with the apparatus ID already acquired in step S34 is excluded. That is, in this illustrative embodiment, an apparatus ID is not acquired through the apparatus search in the wireless LAN 102. Also, when the communication unit 55 is not connected to any of the access points 102A, 103A upon the starting of the device selection processing (S44: No), the control program 65 skips over steps S45, S46 and executes processing of step S47, which will be described later.

Then, the control program 65 determines whether there is a further connectable access point (S47). For example, in step S47, the control program 65 may determine whether it is possible to receive a beacon signal from the access point 103A, which has not been connected yet, during the device selection processing. When it is possible to receive a beacon signal from the access point 103A (S47: Yes), the control program 65 connects the communication unit 55 to the access point 103A (S48), and again executes the processing of step S45 and thereafter. The processing of step S48 may be common to the processing of step S19 shown in FIG. 4.

In this illustrative embodiment, in steps S45, S46 that are executed with the communication unit 55 being connected to the access point 103A, the apparatus ID "MFC-C" of the complex machine 10C and the apparatus ID "MFC-D" of the complex machine 10D are acquired. Also, it is assumed that the operation information acquired from the complex machine 10C, 10D indicate the first operation "SCAN" and the second operation "PRINT". The control program 65 repeatedly executes the processing of steps S45 to S48 for all the connectable access points 102A, 103A. In other words, in steps S45 to S48 that are repeatedly executed, the control program 65 sequentially connects the communication unit 55 to each of the communication networks to search an apparatus belonging to each communication network. The processing of steps S45 to S48 is an example of the apparatus search processing.

Then, when there is no further connectable access point (S47: No), the control program 65 displays a first apparatus selection screen on the display unit 53 (S49). FIG. 10B illustrates an example of the first apparatus selection screen. The first apparatus selection screen shown in FIG. 10B includes one or more apparatus icons. Each apparatus icon is denoted with one apparatus ID acquired in steps S43, S46. The first apparatus selection screen shown in FIG. 10B includes four apparatus icons denoted with the apparatus IDs "server A", "MFC-A", "MFC-C", "MFC-D".

Then, when the operation unit 54 receives a user's operation of tapping one position of the plurality of apparatus icons (S50: Yes), the control program 65 registers, in a new cooperation operation list, an apparatus ID denoted for the apparatus icon, a first operation represented by the operation information acquired from the apparatus identified with the apparatus ID, and an SSID for performing wireless communication with the apparatus identified with the apparatus ID. The processing of steps S49 to S51 is an example of the selection receiving processing of selecting the first apparatus and the second apparatus, which will be described later.

Meanwhile, in this illustrative embodiment, the SSIDs stored with being associated with the apparatus IDs "server A" and "MFC-A" in the cooperation operation list are stored in the data storage area 62B shown in FIG. 3D. Also, the SSIDs stored with being associated with the apparatus IDs "MFC-C", "MFC-D" in the cooperation operation list are the SSIDs of the access points to which the communication unit 55 is connected at the time that the apparatus IDs are found.

Then, when the apparatus selected in step S50 has not been registered yet in the data storage area 62B shown in FIG. 3D (S52: Yes), the control program 65 stores the apparatus ID of the apparatus, the SSID, and the first operation and second operation represented by the operation information in the data storage area 62B shown in FIG. 3D (S53), and ends the device selection processing. The processing of step S53 is an example of the registration processing. On the other hand, when the apparatus selected in step S50 has been already registered (S52: No), the control program 65 skips over step S53, and ends the device selection processing.

On the other hand, when a position of the '+second apparatus' icon on the additional destination selection screen is tapped, a list of apparatus IDs for identifying the apparatuses capable of executing the second operation is acquired in steps S43 to S48. When a position of the apparatus icon denoted with the apparatus ID on the second apparatus selection screen is tapped, the second operation that can be executed by the apparatus ID is registered in the cooperation operation list. Further, when the selected apparatus ID has not been registered yet, the apparatus ID, the SSID, the first operation and the second operation are stored in the data storage area 62B shown in FIG. 3D. Since the processing of selecting the second apparatus to be included in the cooperation operation is common to the selection processing of the first apparatus, the detailed descriptions thereof are omitted.

Operational Effects of Illustrative Embodiment

According to the cooperation operation control processing of the above illustrative embodiment, it is possible to resume the cooperation operation, which has been interrupted because the wireless communication with the second apparatus could not be performed, as it becomes possible to perform wireless communication with the second apparatus. As a result, it is possible to execute the cooperation operation including the desired second apparatus, irrespective of whether it is possible to perform wireless communication at the present moment. That is, it is possible to execute the cooperation operation without making the user conscious about the configuration of the communication network.

According to the cooperation operation control processing, the user is notified or inquired at the interruption timing and resumption timing of the cooperation operation, so that it is possible to give the user an appropriate notification about the current situation and to allow the user to perform an appropriate operation. For example, it is possible to make the user recognized that the cooperation operation is resumed as it becomes possible to perform wireless communication with the second apparatus, through the notification processing of step S23. As a result, it is possible to suppress the user from performing an operation for restarting the cooperation operation from the beginning. As another example, the unnecessary cooperation operation is suppressed from resuming by the inquiry processing of step S25.

Also, according to the cooperation operation control processing, when the first apparatus and the second apparatus are connected to the same communication network, the target data is transmitted from the first apparatus to the second apparatus without via the portable terminal 50. As a result, as compared to a configuration where the portable terminal 50 is configured to relay the target data, it is possible to improve the throughput of the cooperation operation and to reduce the processing load of the portable terminal 50.

Meanwhile, in the cooperation operation control processing, the first determination processing is executed as the reception processing is completed. However, the execution timing of the first determination processing is not limited thereto. For example, the control program 65 may be configured to repeatedly execute the first determination processing at a predetermined time interval after the cooperation operation control processing starts until the reception processing is completed. Also, when it is determined in the first determination processing that it becomes possible to perform wireless communication with the second apparatus during the reception processing, the control program 65 may execute the reception processing and the direct transmission processing in parallel. That is, the control program 65 may be configured to transmit the target data stored in the RAM to the second apparatus without waiting for the completion of the reception processing. Thereby, the throughput of the cooperation operation is improved.

According to the resumption processing of the illustrative embodiment, the interrupted second operation is resumed in the middle of the operation. Thereby, it is possible to suppress the same image from being redundantly recorded on the plurality of recording sheets in the complex machine 10A. Meanwhile, in the above illustrative embodiment, the resumption processing is executed in the cooperation operation including the second operation "PRINT". However, the second operation in which the resumption processing is executed is not limited thereto. For example, the resumption processing of FIG. 5 may be applied to a second operation of storing the target data received from the portable terminal 50 in the storage unit.

According to the device selection processing of the above illustrative embodiment, it is possible to select the desired first apparatus and second apparatus from the plurality of apparatuses, irrespective of the communication network to which the apparatuses belong or irrespective of whether it is possible to perform wireless communication with the portable terminal 50 at the present moment. That is, it is possible to allow the user to prepare the desired cooperation operation list without making the user conscious about the configuration of the communication network.

Meanwhile, in the above illustrative embodiment, the variety of programs stored in the program storage area 32A, 62A of the storage unit 32, 62 of the complex machine 10 or portable terminal 50 are executed by the CPU 31, 61, so that the respective processing to be executed by the control unit of the present disclosure is implemented. However, the configuration of the control unit is not limited thereto, and a part or all of the configurations may be implemented by hardware such as IC (abbreviation of Integrated Circuit).

Further, the present invention can be implemented not only by the complex machine 10 or portable terminal 50 but also by a program configured to cause the complex machine 10 or portable terminal 50 to execute the processing. The program may be provided with being recorded in a non-transitory recording medium. The non-transitory recording medium may include a storage unit mounted to a server that can be connected to the complex machine 10 or portable terminal 50 through the communication network, in addition to a CD-ROM, a DVD-ROM and the like. The program stored in the storage unit of the server apparatus may be delivered through the communication network such as the Internet, as information or signal representing the program.

According to the above configuration, it is possible to resume the cooperation operation, which has been interrupted because the wireless communication with the second apparatus could not be performed, as it becomes possible to perform wireless communication with the second apparatus. As a result, it is possible to execute the cooperation operation without enabling a user to be conscious of the configuration of the communication network. In the meantime, the storing control processing of storing the target data in the storage unit is different from the processing of temporarily storing the target data received from the first apparatus in a temporary memory.

According to the program described in the specification, it is possible to resume the cooperation operation in the middle of the operation, which has been interrupted because the wireless communication with the second apparatus could not be performed, as it becomes possible to perform wireless communication with the second apparatus. Therefore, it is possible to execute the cooperation operation without enabling the user to be conscious of the configuration of the communication network.

What is claimed is:

1. A non-transitory computer readable recording medium storing a computer program that, when executed by a processor of an information processing apparatus, causes the information processing apparatus to execute:
    receiving, by an operation unit of the information processing apparatus, user input of a start instruction to start a cooperation operation, the cooperation operation configured to cause a first apparatus to transmit target data to the information processing apparatus, the information processing apparatus configured to wirelessly communicate with the first apparatus and a second apparatus through a communication network;
    reception processing of wirelessly receiving the same target data transmitted from the first apparatus in the cooperation operation in response to receiving the user input of the start instruction;
    first determination processing of determining whether a communication unit of the information processing apparatus is in a communicable state capable of wirelessly communicating with the second apparatus;
    when it is determined in the first determination processing that the communication unit is in a non-communicable state incapable of wirelessly communicating with the second apparatus, storing control processing of:
        associating, in a storage unit of the information processing apparatus, the received target data transmitted from the first apparatus in the cooperation operation with apparatus identification information for identifying the second apparatus; and
        storing, in the storage unit, the received target data transmitted from the first apparatus in the cooperation operation in the storage unit;
    after executing the storing control processing, second determination processing of determining whether the communication unit is in the communicable state with the second apparatus; and
    when it is determined in the second determination processing that the communication unit is in the communicable state with the second apparatus after having stored the target data in the storage unit, transmission processing of wirelessly transmitting the same target data stored in the storage unit and previously transmitted from the first apparatus to the information processing apparatus in the cooperation operation, to the second apparatus through the communication unit.

2. The non-transitory computer readable recording medium according to claim 1, wherein:
    the storage unit is configured to store the apparatus identification information and connection information for connecting the communication unit to the communication network to which the apparatus identified by the apparatus identification information belong while the apparatus identification information is associated with the connection information, and
    the computer program further causes the information processing apparatus to execute selection receiving processing of selecting the first apparatus and the second apparatus from a plurality of apparatuses based on the apparatus identification information stored in the storage unit.

3. The non-transitory computer readable recording medium according to claim 2, wherein:

the communication unit is configured to selectively connect to a plurality of communication networks, and the computer program further causes the information processing apparatus to select first apparatus and the second apparatus from the apparatuses based on the apparatus identification information stored in the storage unit in the selection receiving processing, irrespective of whether the communication unit is connected to the communication network which is communicable using the connection information corresponding to the apparatus identification information.

4. The non-transitory computer readable recording medium according to claim 2, wherein:

the communication unit configured to selectively connect to a plurality of communication networks, and the computer program further causes the information processing apparatus to execute:

apparatus search processing of sequentially connecting the communication unit to each of the plurality of communication networks and searching the apparatus belonging to each communication network, the selection receiving processing of selecting the first apparatus and the second apparatus from the apparatuses found in the apparatus search processing, and registration processing of associating the apparatus identification information of the first apparatus and the second apparatus selected in the selection receiving processing with the connection information for connecting the communication unit to the communication networks to which the respective first and second apparatuses belong, and storing the apparatus identification information and the connection information in the storage unit.

5. The non-transitory computer readable recording medium according to claim 2, wherein:

when the first apparatus is in a communicable state capable of wirelessly communicating through a first communication network and the second apparatus is in a communicable state capable of wirelessly communicating through a second communication network different from the first communication network are selected in the selection receiving processing, the computer program causes the information processing apparatus to receive the target data transmitted from the first apparatus during the cooperation operation through the communication unit connected to the first communication network in the reception processing, the computer program causes the information processing apparatus to execute connection switching processing of switching a connection destination of the communication unit from the first communication network to the second communication network by using the connection information stored in the storage unit in association with the apparatus identification information of the second apparatus, after the reception processing is completed and before the transmission processing starts, and the computer program causes the information processing apparatus to transmit the target data stored in the storage unit to the second apparatus through the communication unit connected to the second communication network in the transmission processing.

6. The non-transitory computer readable recording medium according to claim 1, wherein, in response to the determination in the first determination processing that the communication unit is in the non-communicable state with the second apparatus, the computer program causes the information processing apparatus to execute notification processing of notifying that the transmission processing is to be executed when it is determined in the second determination processing that the communication unit is in the communicable state with the second apparatus.

7. The non-transitory computer readable recording medium according to claim 1, wherein, when it is determined in the second determination processing that the communication unit is in the communicable state with the second apparatus, the computer program causes the information processing apparatus to execute inquiry processing of asking a user whether to execute the transmission processing, through the operation unit, before executing the transmission processing, and wherein, when the operation unit receives user input of an execution instruction to execute the transmission processing, the computer program causes the information processing apparatus to execute the transmission processing.

8. The non-transitory computer readable recording medium according to claim 1, wherein, when it is determined in the first determination processing that the communication unit is in the communicable state with the second apparatus, the computer program causes the information processing apparatus to execute direct transmission processing of wirelessly transmitting the target data received in the reception processing to the second apparatus through the communication unit.

9. The non-transitory computer readable recording medium according to claim 8, wherein, when it is determined in the first determination processing during the reception processing that the communication unit is in the communicable state with the second apparatus, the computer program causes the information processing apparatus to execute the reception processing and the direct transmission processing in parallel.

10. The non-transitory computer readable recording medium according to claim 8, wherein:

the target data transmitted from the first apparatus in the cooperation operation comprises a plurality of images to be recorded on each of a plurality of recording sheets, the second apparatus is caused to sequentially record the plurality of images represented by the target data transmitted from the first apparatus in the cooperation operation onto the recording sheets, and the computer program is configured to cause the information processing apparatus to execute:

the storing control processing when the communication unit shifts to a non-communicable state incapable of wirelessly communication with the second apparatus during the direct transmission processing;

transmission instruction processing of, in response to the determination in the second determination processing that the communication unit is in the communicable state with the second apparatus, wirelessly transmitting transmission instruction information for requesting the second apparatus to transmit resumption information for specifying a resumption image of the plurality of images which is to be recorded onto a next recording sheet, to the second apparatus through the communication unit; and partial transmission processing of, in response to receiving the resumption information from the second apparatus through the communication unit, wirelessly transmitting other target data of the resumption image and the sequentially recorded images stored in the storage unit, to the second apparatus through the communication unit, the resumption image being specified by the resumption information.

11. The non-transitory computer readable recording medium according to claim 1, wherein, when the first apparatus and the second apparatus belong to the same communication network at the time that the operation unit receives the start instruction, the computer program enables the information processing apparatus to execute transmission and reception control processing of enabling the first apparatus to transmit the target data to the second apparatus.

12. An information processing apparatus configured to control a cooperation operation that is to be executed by a first apparatus and a second apparatus of a plurality of apparatuses, wherein the cooperation operation is to cause the first apparatus to execute a first operation including transmitting target data to the information processing apparatus, and is to cause the second apparatus to execute a second operation including receiving the target data from the information processing apparatus after the first operation, the information processing apparatus comprising:
 a communication unit configured to perform wireless communication with the plurality of apparatuses through a communication network;
 an operation unit configured to receive a user's operation;
 a processor; and
 a storage unit storing a computer readable program, when executed by the processor, causing the information processing apparatus to execute:
  receiving, by the operation unit, user input of a start instruction to start the cooperation operation;
  reception processing of wirelessly receiving the same target data transmitted from the first apparatus in the cooperation operation in response to receiving the user input of the start instruction;
  first determination processing of determining whether the first apparatus is in a communicable state capable of wirelessly communicating with the second apparatus;
  when it is determined in the first determination processing that the communication unit is in a non-communicable state incapable of wirelessly communicating with the second apparatus, storing control processing of:
   associating the received target data transmitted from the first apparatus in the cooperation operation with apparatus identification information for identifying the second apparatus; and
   storing the received target data from the first apparatus in the cooperation operation in the storage unit;
  after executing the storing control processing, second determination processing of determining whether the communication unit is in the communicable state with the second apparatus; and
  when it is determined in the second determination processing that the communication unit is in the communicable state with the second apparatus, transmission processing of wirelessly transmitting the same target data stored in the storage unit and previously transmitted from the first apparatus in the cooperation operation, to the second apparatus through the communication unit.

13. A cooperation system comprising:
 a first apparatus;
 a second apparatus; and
 an information processing apparatus configured to control a cooperation operation that is to be executed by the first apparatus and the second apparatus of a plurality of apparatuses, wherein the cooperation operation causes the first apparatus to execute a first operation including transmitting target data to the information processing apparatus, and causes the second apparatus to execute a second operation including receiving the same target data, transmitted from the first apparatus, from the information processing apparatus after the first operation,
 wherein the information processing apparatus comprises:
  a communication unit configured to perform wireless communication with the plurality of apparatuses through a communication network;
  an operation unit configured to receive a user's operation;
  a processor; and
  a storage unit storing a computer readable program that, when executed by the processor, causes the information processing apparatus to execute:
   receiving, by the operation unit, user input of a start instruction to start the cooperation operation;
   reception processing of wirelessly receiving the same target data transmitted from the first apparatus in the cooperation operation in response to receiving the user input of the start instruction;
   first determination processing of determining whether the first apparatus is in a communicable state capable of wirelessly communicating with the second apparatus;
   when it is determined in the first determination processing that the communication unit is in a non-communicable state incapable of communicating with the second apparatus, storing control processing of:
    associating the received target data with apparatus identification information for identifying the second apparatus; and
    storing the received target data transmitted from the first apparatus in the cooperation operation in the storage unit;
   after executing the storing control processing, second determination processing of determining whether the communication unit is in the communicable state with the second apparatus; and
   when it is determined in the second determination processing that the communication unit is in the communicable state with the second apparatus, transmission processing of wirelessly transmitting the same target data stored in the storage unit and previously transmitted from the first apparatus in the cooperation operation, to the second apparatus through the communication unit.

* * * * *